(12) United States Patent
Yamada et al.

(10) Patent No.: US 7,695,791 B2
(45) Date of Patent: *Apr. 13, 2010

(54) OPTICAL RECORDING MEDIUM

(75) Inventors: Takashi Yamada, Tokyo (JP); Tomoki Ushida, Tokyo (JP)

(73) Assignee: TDK Corporation, Tokyo (JP)

( * ) Notice: Subject to any disclaimer, the term of this patent is extended or adjusted under 35 U.S.C. 154(b) by 709 days.

This patent is subject to a terminal disclaimer.

(21) Appl. No.: 11/208,640

(22) Filed: Aug. 23, 2005

(65) Prior Publication Data
US 2006/0046014 A1 Mar. 2, 2006

(30) Foreign Application Priority Data
Aug. 24, 2004 (JP) .............................. 2004-243237

(51) Int. Cl.
*B32B 3/02* (2006.01)
(52) U.S. Cl. ................. 428/64.1; 428/64.4; 430/270.11
(58) Field of Classification Search ............... 428/64.1, 428/64.4; 430/270.12
See application file for complete search history.

(56) References Cited

U.S. PATENT DOCUMENTS 6,833,393 B2 * 12/2004 Ishizeki et al. .............. 522/131

2002/0081525 A1 * 6/2002 Takamori et al. ........ 430/273.1
2004/0218511 A1 * 11/2004 Kondo et al. ................ 369/288

FOREIGN PATENT DOCUMENTS

| JP | 4-195745 | | 7/1992 |
| JP | 08-239579 | | 9/1996 |
| JP | 2001-014731 | * | 1/2001 |
| JP | 2003-059097 | | 2/2003 |

OTHER PUBLICATIONS

U.S. Appl. No. 11/126,284, filed May 11, 2005, Yamada et al.
U.S. Appl. No. 11/180,577, filed Jul. 14, 2005, Yamada et al.
U.S. Appl. No. 11/208,640, filed Aug. 23, 2005, Yamada et al.

* cited by examiner

*Primary Examiner*—Elizabeth Mulvaney
(74) *Attorney, Agent, or Firm*—Oblon, Spivak, McClelland, Maier & Neustadt, L.L.P.

(57) ABSTRACT

An optical recording medium 1 includes a support substrate 2, an information layer 3 formed on one of the surfaces of the support substrate 2, a first resin layer 4 formed on the information layer 3 and having a thickness of 30 to 200 μm, a moisture-proof layer 5 formed on the other surface of the support substrate 2, a second resin layer 6 formed on the moisture-proof layer 5 and having a thickness of 30 to 200 μm, and a label layer 7 formed on the second resin layer 6, and has such a structure that a laser beam is irradiated through the first resin layer 4. The second resin layer 6 contains 0.5 to 2.8 mass part of a silicon antifoaming agent with respect to 100 mass part of an ultraviolet curing resin, and is formed by a screen printing method.

4 Claims, 6 Drawing Sheets

OPTICAL RECORDING MEDIUM

BACKGROUND OF THE INVENTION

The present invention relates to an optical recording medium, and more particularly to an optical recording medium capable of forming a resin layer having an excellent surface shape and minimizing a warp while preventing an increase in a cost.

Conventionally, optical recording media represented by a CD and a DVD have been utilized widely as recording media for recording digital data. These optical recording media can be classified into read-only optical recording media which can neither once write nor rewrite data, for example, a CD-ROM and a DVD-ROM, write-once optical recording media which can once write data but cannot rewrite data, for example, a CD-R and a DVD-R, and rewritable optical recording media capable of rewriting data, for example, a CD-RW and a DVD-RW.

In order to reproduce data from these optical recording media, a laser beam set to have a power for reproduction is irradiated on the optical recording media and a reflected light is read so that the data are reproduced. A recording mark formed on the optical recording medium has a reflectance for the laser beam which is different from reflectances in the other regions. For this reason, the quantity of the reflected laser beam is varied depending on the presence of the recording mark. Accordingly, the quantity of the reflected laser beam is detected by a photodetector and is converted into an electric signal so that a reproducing signal is generated and the data are reproduced.

For this reason, it is necessary to reliably cause a laser beam reflected by the optical recording medium to be incident on the light receiving surface of the photodetector in order to read the data recorded on the optical recording medium as desired.

In the case in which a great warp is generated on the optical recording medium by a change in a temperature or a humidity during use, however, the angle of incidence of the laser beam on the optical recording medium fluctuates. For this reason, there is a possibility that the reflected laser beam might not be reliably incident on the photodetector.

In order to reproduce the data recorded on the optical recording medium as desired, accordingly, the warp of the optical recording medium is to be reduced. For example, Patent Document 1 has disclosed an optical recording medium in which the warp is reduced by the formation of a layer for preventing the warp on the back side of the optical recording medium.

The optical recording medium described in JP-A-4-195745 comprises a first dielectric layer formed on the surface side of a substrate and a second dielectric layer formed on the back side of the substrate and having a coefficient of thermal expansion which is equal to that of the first dielectric layer. In such an optical recording medium, a stress and a bending moment which are generated on the first dielectric layer are cancelled with a stress and a bending moment which are generated on the second dielectric layer depending on a change in a temperature or a humidity during use. Thus, a warp is prevented from being generated on the optical recording medium.

On the other hand, in recent years, there has been proposed a next generation optical recording medium having a larger capacity and a higher data transfer rate. In such a next generation optical recording medium, a wavelength λ of a laser beam is reduced and a numerical aperture NA of an objective lens for collecting a laser beam is increased to enhance a recording density.

When the wavelength λ of the laser beam is reduced and the numerical aperture NA of the objective lens is increased, however, there is a problem in that an angle error permitted for the tilt of the optical axis of the laser beam to the optical recording medium, that is, a tilt margin T is greatly reduced as shown in the following equation (1).

$$T \propto \frac{\lambda}{d \cdot NA^3} \quad (1)$$

In the equation (1), d represents a distance from a light incidence plane to the surface of an information layer on which data are to be recorded, that is, a thickness of a layer through which a laser beam is transmitted before the laser beam reaches the information layer. As is apparent from the equation (1), the tilt margin T is decreased when the wavelength λ of the laser beam is reduced and the NA of the objective lens is increased, and is increased when the thickness d of the layer through which the laser beam is transmitted is reduced.

Therefore, the next generation optical recording medium has such a structure that a thin resin layer having a thickness of 30 to 200 μm is formed on the information layer and a laser beam is irradiated from the resin layer side to record and reproduce data. Consequently, the tilt margin is enlarged.

For this reason, the next generation optical recording medium usually has an asymmetrical structure in which an information layer and a resin layer are sequentially laminated and formed on a support substrate having a thickness of approximately 1.1 mm and two disk-shaped substrates having a thickness of 0.6 mm are stuck with the information layer interposed therebetween differently from a DVD optical recording medium having a symmetrical structure.

In the next generation optical recording medium, however, the thicknesses of the support substrate and the resin layer are different from each other. In the case in which a warp is apt to be generated on the optical recording medium, particularly, the support substrate and the resin layer are formed by different materials due to a change in a temperature or a humidity, therefore, physical properties such as a rigidity, a coefficient of linear expansion, a Young's modulus of elasticity and an internal stress of the material forming the support substrate and the material forming the resin layer are different from each other. For this reason, the warp is generated on the optical recording medium still more easily.

As described above, in the next generation optical recording medium, particularly, there is a problem in that a warp is apt to be generated. Also in the next generation optical recording medium, therefore, there has been made a trial that a resin layer having almost the same physical properties as the physical properties of a resin layer formed on the surface side of the support substrate is formed on the back side of the support substrate and stresses applied to the surface and the back face of the support substrate are offset to reduce the warp to be generated on the optical recording medium.

In order to form the resin layer having almost the same physical properties on the back side of the support substrate, however, it is necessary to carry out a spin coating step to form the resin layer, and to then invert the support substrate and to perform the spin coating step again. Furthermore, a label is generally formed on the back side of the optical recording medium in order to display data recorded on the optical recording medium or the type of the optical recording medium or to give a decorative design. A label layer for forming the label is usually obtained by a screen printing method in place of a spin coating method. For this reason, there is a problem in that a producing step becomes very complicated, causing an increase in a manufacturing cost.

In order to prevent the increase in the manufacturing cost, therefore, it is effective to form the resin layer on the back side of the support substrate by the screen printing method and to provide the resin layer and the label layer by the same forming method to simplify a manufacturing process.

However, a resin layer having a thickness of 30 to 200 μm is much thicker than the label layer, and it is necessary to use a screen printing plate which has a greater opening width and is coarser as compared with a screen printing plate to be used for forming the label layer in order to form the resin layer by the screen printing method. In the case in which the resin layer is formed by using such a coarse screen printing plate, the flatness of the surface of the resin layer is easily damaged so that the shape of the surface of the resin layer is transferred to the label layer to be formed thereon. For this reason, there is a problem in that the external shape of the label layer is deteriorated.

In the case in which the flatness of the surface of the resin layer is considerably damaged, particularly, the thickness of the resin layer becomes non-uniform. Therefore, the external appearance of the label layer is adversely affected, and furthermore, physical properties are made greatly different from those of the resin layer on the surface side of the support substrate. As a result, there is also a problem in that it is hard to prevent a warp from being generated on the optical recording medium.

SUMMARY OF THE INVENTION

Accordingly, it is an object of the invention to provide an optical recording medium capable of forming a resin layer having an excellent surface shape and minimizing a warp while preventing an increase in a cost.

In order to achieve the object, the inventor reached the following conclusion as a result of vigorous and repetitive studies. In the case in which a resin layer is formed by using a comparatively coarse screen printing plate, the flatness of the surface of the resin layer is damaged mainly because the entanglement of the resin is caused and bubbles are generated in a coated film of an ultraviolet curing resin on the screen printing plate and are distributed to the vicinity of the surface of the coated film when the ultraviolet curing resin is pushed out.

The invention is based on such a knowledge and can be achieved by an optical recording medium comprising a support substrate, and a first resin layer and a second resin layer which are formed to interpose the support substrate therebetween and have thicknesses of 30 to 200 μm respectively, a laser beam being irradiated through the first resin layer, wherein the second resin layer contains 0.5 to 2.8 mass parts of a silicon antifoaming agent with respect to 100 mass parts of an ultraviolet curing resin and is formed by a screen printing method.

When the antifoam agent is added to the system, particles of the antifoaming agent are attached to a foam film of the system. The antifoaming agent is defined as what causes foaming suppression and defoaming effect due to the surface tension of the antifoaming agent being smaller than that of the foam film. Polysiloxane or an agent containing polysiloxane can be used as a silicon antifoaming agent, which have a characteristic that it is not solved in the system and is kept a stable distribution condition and has a surface tension lower than that of the system, and is high in a interfacial tension.

In the case in which an amount of a silicon antifoaming agent to be added is smaller than 0.5 mass part, an antifoaming action becomes insufficient so that it is hard to remove the bubbles generated in the ultraviolet curing resin coated film. On the other hand, in the case in which the same amount is larger than 2.8 mass part, the silicon antifoaming agent soaks into the surface of the second resin layer and a coloring resin for forming a label layer is repelled by the soaking silicon antifoaming agent so that a color unevenness or a turbidity might be generated in the label layer.

In the case in which the amount of the silicon antifoaming agent to be added is larger than 2.8 mass part, moreover, the physical properties of the ultraviolet curing resin for forming the second resin layer might be changed by the influence of the silicon antifoaming agent so that the physical properties of the second resin layer might be greatly different from those of the first resin layer.

According to the invention, 0.5 to 2.8 mass part of the silicon antifoaming agent is added to the ultraviolet curing resin for forming the second resin layer, and the bubbles generated in the ultraviolet curing resin coated film are removed. Therefore, it is possible to form the second resin layer having an excellent surface shape and a uniform thickness by a screen printing method.

In the invention, thus, the second resin layer can be formed by the screen printing method. Therefore, it is possible to continuously form both the second resin layer and the label layer by a single screen printer. When forming the second resin layer and the label layer, accordingly, it is possible to omit a time and labor for carrying the support substrate in/out of a spin coating device. Consequently, it is possible to simplify a manufacturing process.

In the case in which the second resin layer is formed by the screen printing method, furthermore, the ultraviolet curing resin is pushed out of the screen printing plate to form the ultraviolet curing resin coated film. By utilizing a centrifugal force to develop the ultraviolet curing resin, it is also possible to further reduce the amount of the ultraviolet curing resin to be used as compared with a spin coating method for forming the ultraviolet curing resin coated film.

According to the invention, therefore, it is possible to form a resin layer having an excellent flatness of the surface on the back face of the support substrate while simplifying the manufacturing process and reducing the amount of the ultraviolet curing resin to be used. Therefore, it is possible to form a second resin layer having an excellent surface shape, thereby minimizing the warp of the optical recording medium while preventing an increase in a cost.

In a preferred embodiment according to the invention, the second resin layer contains 0.5 to 1.5 mass part of the silicon antifoaming agent and a non-silicon antifoaming agent.

The silicon antifoaming agent has an antifoaming action and such a property as to repel a coloring resin for forming the label layer. In the case in which the amount of addition is comparatively large in 0.5 to 2.8 mass part, therefore, the bubbles generated in the ultraviolet curing resin coated film can be removed quickly. On the other hand, a great color unevenness or turbidity is not generated in the label layer. However, there is a possibility that the coloring resin for forming the label layer might easily be repelled.

To the contrary, the non-silicon antifoaming agent has an inferior antifoaming action to the silicon antifoaming agent. On the other hand, the non-silicon antifoaming agent has a property that the coloring resin for forming the label layer is repelled with more difficulty as compared with the silicon antifoaming agent. By using the non-silicon antifoaming agent in combination with the silicon antifoaming agent in an amount of addition of 0.5 to 1.5 mass part which is comparatively small, therefore, it is possible to increase the total amount of the antifoaming agent while reliably preventing the repellency of the coloring resin for forming the label layer. Thus, it is possible to form the second resin layer which is very excellent in the flatness of a surface and a congeniality to the label layer.

In a further preferred embodiment according to the invention, the second resin layer contains 1.0 to 5.5 mass part of the non-silicon antifoaming agent. In the case in which the amount of the non-silicon antifoaming agent to be added is smaller than 1.0 mass part, there is a possibility that the antifoaming action might be insufficient. On the other hand, in the case in which the same amount is larger than 5.5 mass part, there is a possibility that the curing property of the ultraviolet curing resin for forming the second resin layer and the physical properties obtained after the curing might be affected adversely.

In the invention, it is preferable that the second resin layer should be formed by an ultraviolet curing resin having the antifoaming agent added thereto, and physical properties obtained after the curing of the ultraviolet curing resin having the antifoaming agent added thereto should be substantially identical to those of the first resin layer.

In this specification, the ultraviolet curing resin in which the physical properties obtained after the curing are substantially identical to those of the first resin layer implies an ultraviolet curing resin in which at least differences in a Young's modulus of elasticity and a coefficient of linear expansion from those of the first resin layer are equal to or smaller than 5%.

In the case in which the second resin layer is formed by an ultraviolet curing resin in which the physical properties obtained after the curing are substantially identical to those of the first resin layer, two resin layers having the same physical properties can be formed on both the surface and the back face of the support substrate so that a warp to be generated in the optical recording medium can be suppressed more effectively.

In the invention, it is preferable that the second resin layer should be formed by a screen printing method using a screen printing plate of a metal mask or a screen printing plate having a double mesh structure. In the case in which these screen printing plates are used, it is possible to form a second resin layer having a thickness of 30 to 200 μm by the screen printing method as desired.

In a preferred embodiment according to the invention, a laser beam having a wavelength of 380 to 450 nm is irradiated through the first resin layer so that data can be recorded or reproduced.

According to the invention, it is possible to provide an optical recording medium capable of forming a resin layer having an excellent surface shape and minimizing a warp while preventing an increase in a cost.

DETAILED DESCRIPTION OF THE PREFERRED EMBODIMENTS

A preferred embodiment according to the invention will be described below in detail with reference to the accompanying drawings.

Figure 1:
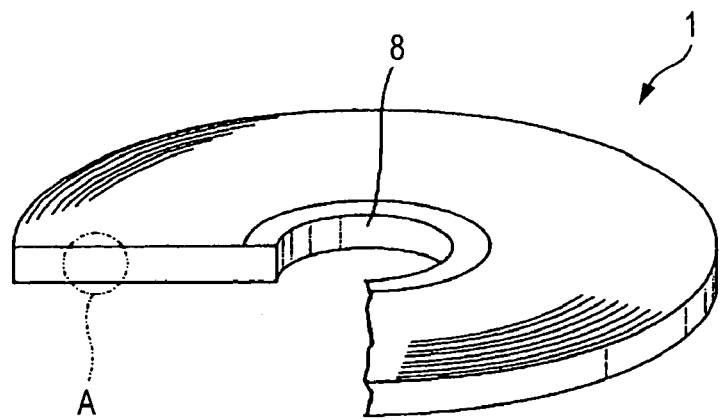
FIG. 1 is a schematic perspective view showing an optical recording medium according to a preferred embodiment of the invention.
Figure 2:
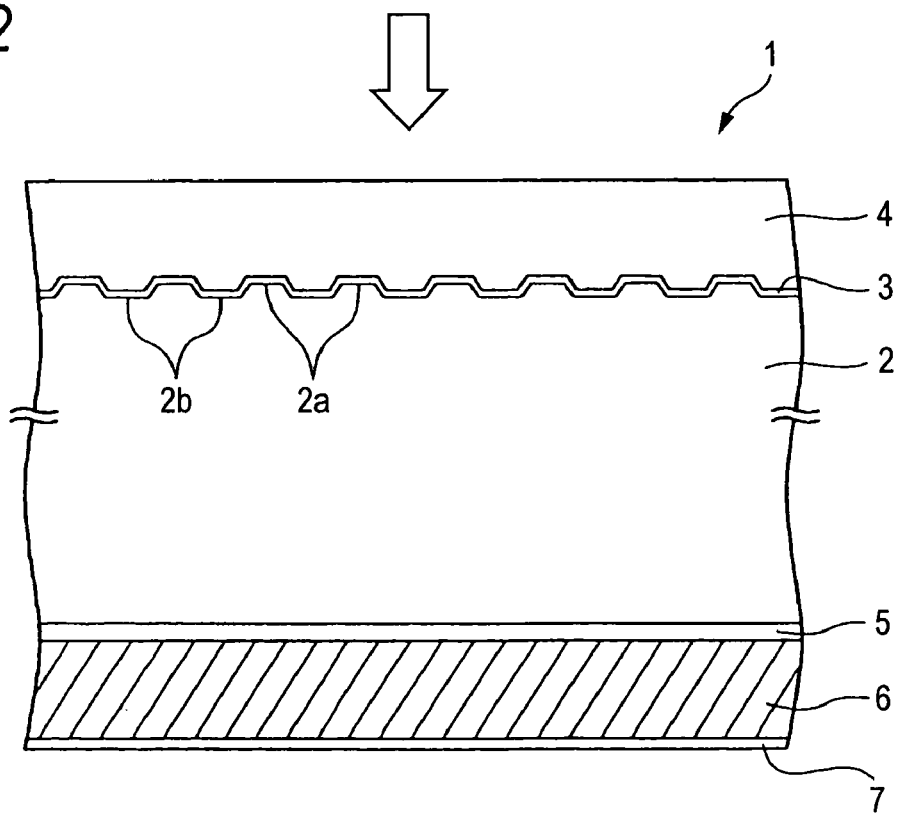
FIG. 2 is a schematic enlarged sectional view showing a portion indicated as A in FIG. 1.

FIG. 1 is a schematic perspective view showing an optical recording medium 1 according to the preferred embodiment of the invention, and FIG. 2 is a schematic enlarged sectional view showing a portion indicated as A in FIG. 1.

As shown in FIG. 1, the optical recording medium 1 takes the shape of a disk and has a central portion on which a center hole 8 for setting the optical recording medium 1 into a recording and reproducing machine is formed. Moreover, the optical recording medium 1 has such a structure that a laser beam having a wavelength of 380 to 450 nm is irradiated through an objective lens (not shown) having a numerical aperture NA to satisfy $\lambda/NA \leq 640$ nm in a direction shown in an arrow of FIG. 2 so that data are recorded and reproduced.

As shown in FIG. 2, the optical recording medium 1 comprises a support substrate 2, an information layer 3 formed on one of the surfaces of the support substrate 2, a first resin layer 4 formed on the information layer 3, a moisture-proof layer 5 formed on the other surface of the support substrate 2, a second resin layer 6 formed on the moisture-proof layer 5, and a label layer 7 formed on the second resin layer 6.

The support substrate 2 functions as the support of the optical recording medium 1, and the information layer 3 is to record data thereon. The first resin layer 4 serves to protect the surface of the information layer 3, and the moisture-proof layer 5 plays a part in preventing water from permeating into the support substrate 2 from the outside of the optical recording medium 1. The second resin layer 6 functions as a warp preventing layer and plays a part in minimizing the warp generated on the optical recording medium 1 by canceling a stress or a bending moment which is generated on the first resin layer 4 with a stress or a bending moment which is generated on the second resin layer 6. The label layer 7 serves to display information stored in the optical recording medium 1 or the type of the optical recording medium 1, or is provided with a label for giving a decorative design.

Figure 3:
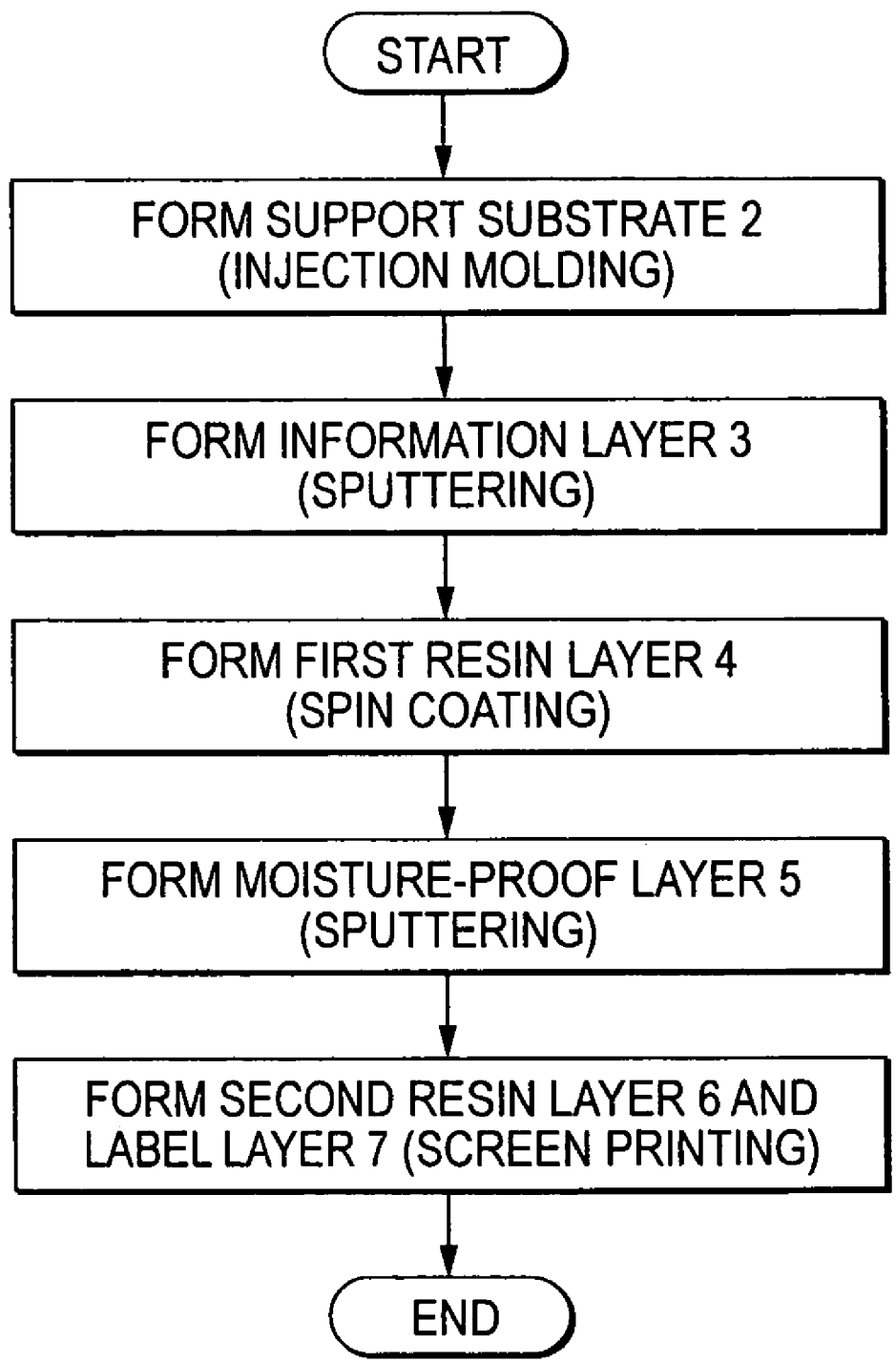
FIG. 3 is a flowchart showing a routine for manufacturing the optical recording medium.

The optical recording medium 1 having the structure described above is manufactured in the following manner. FIG. 3 is a flowchart showing a manufacturing routine for the optical recording medium 1, and FIGS. 4(a) to 4(d) and FIGS. 5(a) and 5(b) are views showing steps in a method of manufacturing the optical recording medium 1.

Figure 4:
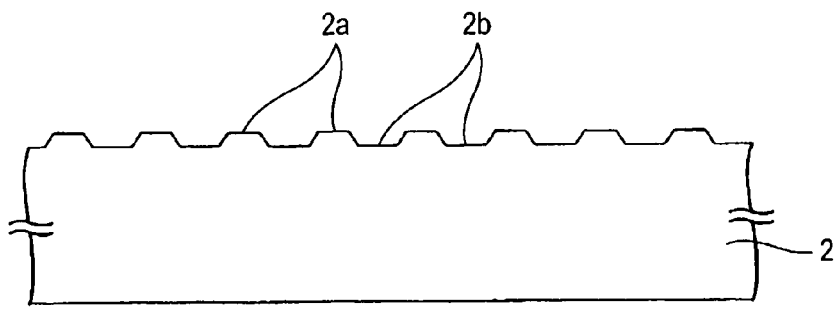
FIGS. 4(a) to 4(d) are views showing steps in the process for manufacturing the optical recording medium.
Figure 4:
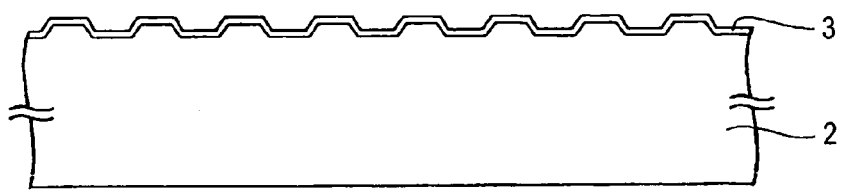
Figure 4:
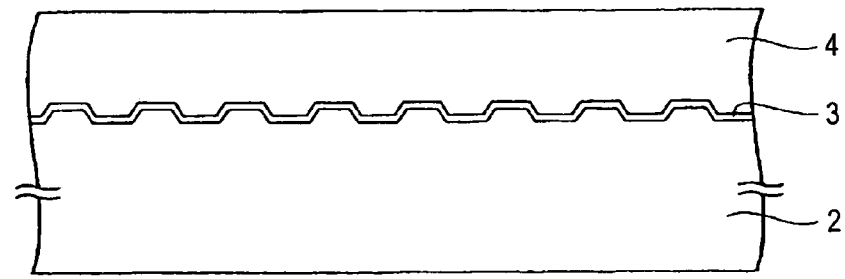
Figure 4:
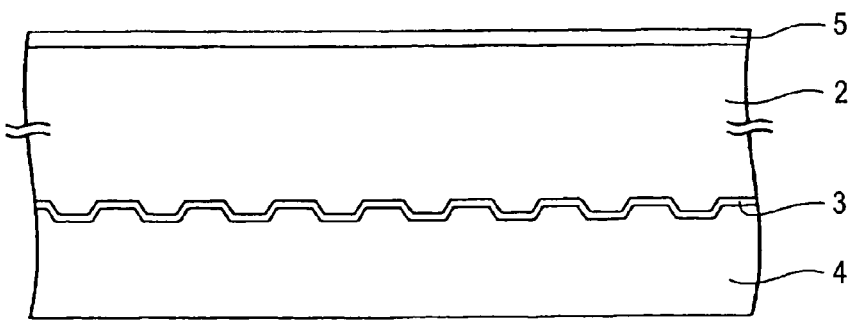

As shown in FIG. 4(a), first of all, the support substrate 2 having a groove 2a and a land 2b on a surface is formed by injection molding using a stamper.

A material for forming the support substrate 2 is not particularly restricted if it can function as a support for the optical recording medium 1. For example, it is possible to use a polycarbonate resin and an olefin resin.

The thickness of the support substrate 2 is not particularly restricted but the support substrate 2 is preferably formed to have a thickness of approximately 1.1 mm.

The groove 2a and/or the land 2b function(s) as a guide track for a laser beam in the case in which data are to be recorded on the information layer 3.

When the support substrate 2 is formed, the information layer 3 is formed over almost the whole surface of the support substrate 2 on which the groove 2a and the land 2b are formed as shown in FIG. 4(b).

In the embodiment, the information layer 3 is not particularly restricted but may be formed by including a write-once type recording film containing, as a principal component, an organic pigment such as a cyanine system pigment or a porphyrin system pigment or including a phase-change type recording film containing, as a principal component, a phase-change material such as Ge—Sb—Te or In—Sb—Te.

Moreover, the information layer 3 does not need to be constituted by only the recording film but another layer such as a dielectric film or a reflecting film may be formed on the surface or/and the back face of the recording film if necessary.

It is preferable that the information layer 3 should be formed to have a thickness of 20 to 300 nm and it is further preferable that the information layer 3 should be formed to have a thickness of 50 to 200 nm.

When the information layer 3 is formed on the support substrate 2, the support substrate 2 is subsequently set into a spin coating device and the first resin layer 4 is formed on the information layer 3 by a spin coating method as shown in FIG. 4(c).

The first resin layer 4 is required to be optically transparent and to have a small optical absorption and reflection and a small double refraction in the wavelength region of a laser beam to be used, that is, a range of 380 to 450 nm and is formed by an ultraviolet curing resin, for example.

The ultraviolet curing resin to be used for forming the first resin layer 4 contains a photopolymerizing monomer, a photopolymerizing oligomer, a photoinitiator and other additives as desired. A monomer having a molecular weight of less than 2000 is suitable for the photopolymerizing monomer and examples of the photopolymerizing monomer include monofunctional (meth)acrylate and multifunctional (meth)acrylate. Moreover, examples of the photopolymerizing oligomer include an oligomer containing or introducing, in a molecule, a group to be crosslinked or polymerized by an ultraviolet irradiation such as an acrylic double bond, an allylic double bond or an unsaturated double bond. Furthermore, any well-known photoinitiator may be used, and a molecule cleavage type photopolymerizing initiator can be used, for example.

In the embodiment, the first resin layer 4 is formed to have a thickness of 30 to 200 μm.

When the first resin layer 4 is formed on the information layer 3, the support substrate 2 having the information layer 3 and the first resin layer 4 formed thereon is then set into a sputtering device in such a manner that a surface on which the groove 2a and the land 2b are not formed is positioned in an upper part, and the moisture-proof layer 5 is formed on the surface of the support substrate 2 by a sputtering method as shown in FIG. 4(d).

A material for forming the moisture-proof layer 5 is not particularly restricted if it can prevent water entering the support substrate 2. It is preferable that the moisture-proof layer 5 should be formed by using a dielectric material constituted by at least one metal selected from the group consisting of Si, Zn, Al, Ta, Ti, Co, Zr, Pb, Ag, Sn, Ca, Ce, V, Cu, Fe, Mg, B and Ba, oxides, nitrides, sulfides or fluorides containing these metals, or their composite substance.

It is preferable that the moisture-proof layer 5 should be formed to have a thickness of 20 to 300 nm and it is further preferable that the moisture-proof layer 5 should be formed to have a thickness of 30 to 200 nm.

Figure 5:
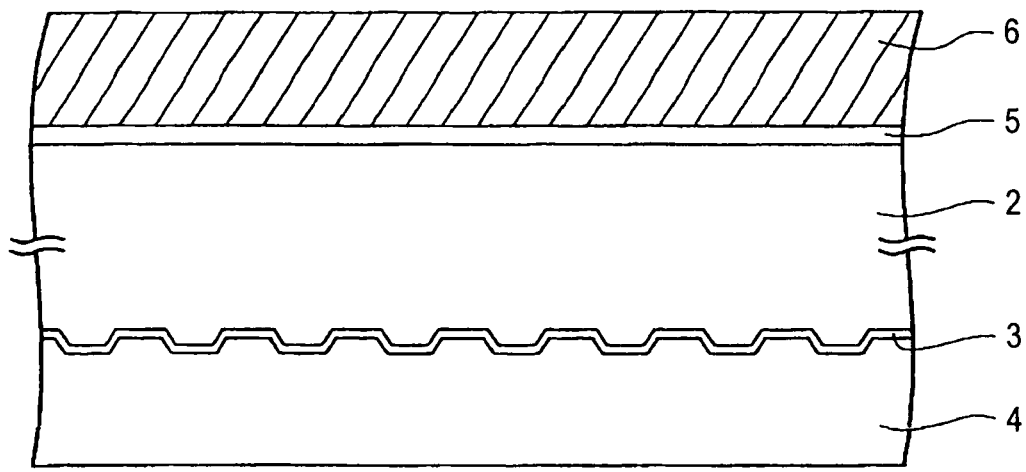
FIGS. 5(a) and 5(b) are views showing steps in the process for manufacturing the optical recording medium.
Figure 5:
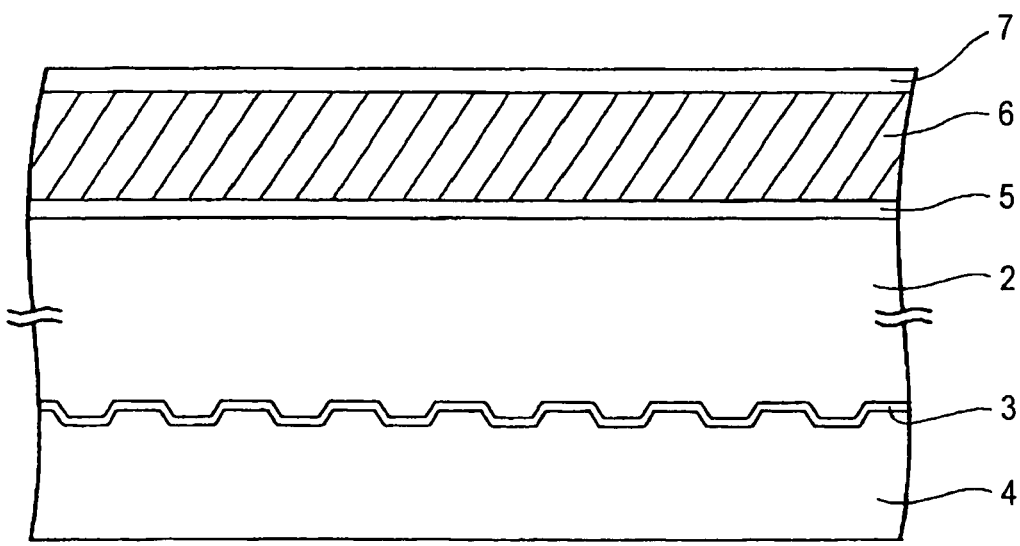

When the moisture-proof layer 5 is formed, the support substrate 2 is subsequently set into a screen printer and the second resin layer 6 is formed on the surface of the moisture-proof layer 5 by a screen printing method as shown in FIG. 5(a).

The second resin layer 6 is formed to have a thickness of 30 to 200 μm in the same manner as the first resin layer 4. However, the second resin layer 6 does not need to be formed in a thickness which is equal to the thickness of the first resin layer 4, and may be formed to have a thickness which is different from the thickness of the first resin layer 4 within such a range that physical properties are not greatly different from those of the first resin layer 4 and the warp of the optical recording medium 1 can be minimized.

It is preferable that the second resin layer 6 should have the physical properties such as a rigidity, a coefficient of linear expansion, a Young's modulus of elasticity and an internal stress which are the same as those of the first resin layer 4. Accordingly, it is preferable that the second resin layer 6 should be formed by the same ultraviolet curing resin as the ultraviolet curing resin to be used for forming the first resin layer 4. However, it is preferable that the ultraviolet curing resin for forming the second resin layer 6 should have almost the same physical properties after curing as those of the first resin layer 4, and the second resin layer 6 does not need to be formed by the identical ultraviolet curing resin to that of the first resin layer 4.

While the second resin layer 6 is formed by the screen printing method in the embodiment, it is preferable to use an ultraviolet curing resin having a viscosity of 3000 to 10000 mPa·s in an environment of 25° C. in order to form a thick resin layer having a thickness of 30 to 200 μm by the screen printing method. When the viscosity of the ultraviolet curing resin is excessively low, it is hard to form a thick ultraviolet curing resin coated film, and furthermore, the ultraviolet curing resin might leak out of a screen printing plate. To the contrary, when the viscosity of the ultraviolet curing resin is excessively high, there is a possibility that the ultraviolet curing resin might not be pushed out of the screen printing plate as desired.

In the case in which a thick resin layer having a thickness of 30 to 200 μm is to be formed by the screen printing method, furthermore, it is also necessary to use a comparatively coarse screen printing plate as well as the ultraviolet curing resin having the viscosity of 3000 to 10000 mPa·s in the environment of 25° C. In the case in which the ultraviolet curing resin coated film is formed by using the comparatively coarse screen printing plate, however, there is a problem in that the flatness of the surface of the coated film is apt to be damaged.

According to the studies of the inventor, it has been found that the flatness of the surface of the coated film is damaged when the ultraviolet curing resin coated film is formed by using the comparatively coarse screen printing plate for the following main reason. More specifically, when the ultraviolet curing resin provided on the screen printing plate is pushed out onto the moisture-proof layer 5, the entanglement of the resin is caused so that bubbles are generated in the ultraviolet curing resin coated film and are distributed to the vicinity of the surface of the coated film.

In the embodiment, therefore, a silicon antifoaming agent is added to the ultraviolet curing resin for forming the second resin layer 6. In the case in which the silicon antifoaming agent is added to the ultraviolet curing resin to form the second resin layer 6, thus, it is also possible to remove the bubbles generated in the ultraviolet curing resin coated film also when forming the second resin layer 6 by using the comparatively coarse screen printing plate. Thus, it is possible to form the second resin layer 6 which is excellent in the flatness of the surface.

It is preferable that the amount of the silicon antifoaming agent to be added should be 0.5 to 2.8 mass part with respect to 100 mass part of the ultraviolet curing resin. In the case in which the amount of the silicon antifoaming agent to be added is smaller than 0.5 mass part, an antifoaming action becomes insufficient so that it is hard to remove the bubbles generated in the ultraviolet curing resin coated film. On the other hand, in the case in which the same amount is larger than 2.8 mass part, the silicon antifoaming agent soaks into the surface of the second resin layer 6 and a coloring resin for forming the label layer 7 is repelled by the soaking silicon antifoaming agent so that a color unevenness or a turbidity might be generated in the label layer 7. In the case in which the amount of the silicon antifoaming agent to be added is larger than 2.8 mass part, moreover, there is also a possibility that the physical properties of the ultraviolet curing resin for forming the second resin layer 6 might be changed by the influence of the silicon antifoaming agent, resulting in a great difference between the physical properties of the second resin layer 6 and those of the first resin layer 4.

The silicon antifoaming agent has the antifoaming action as described above, while it has such a property as to repel the coloring resin for forming the label layer 7. In the case in which 0.5 to 2.8 mass part of the silicon antifoaming agent is added to the ultraviolet curing resin for forming the second resin layer 6 to form the second resin layer 6, therefore, the characteristics of the second resin layer 6 are changed depending on the amount of the silicon antifoaming agent to be added which is smaller or larger in 0.5 to 2.8 mass part.

More specifically, when the silicon antifoaming agent is added in an amount of addition of 0.5 to 1.5 mass part which is comparatively small to form the second resin layer 6, it is possible to reliably prevent the repellency of the coloring resin for forming the label layer 7 and to form the second resin layer 6 having a very excellent congeniality to the label layer 7, while the antifoaming action is slightly deteriorated and a long time is taken for removing the bubbles generated in the ultraviolet curing resin coated film. On the other hand, in the case in which the silicon antifoaming agent is added in the amount of addition of 1.5 to 2.8 mass part which is comparatively large to form the second resin layer 6, the antifoaming action can be very excellent and it is possible to quickly remove the bubbles generated in the ultraviolet curing resin coated film, while a great color unevenness or turbidity is not generated in the label layer 7 but the coloring resin for forming the label layer 7 might be repelled easily.

In the embodiment, therefore, the amount of the silicon antifoaming agent to be added to the ultraviolet curing resin for forming the second resin layer 6 is set to be 0.5 to 1.5 mass part, and furthermore, the non-silicon antifoaming agent is added to the ultraviolet curing resin to which 0.5 to 1.5 mass part of the silicon antifoaming agent is added in order to enhance the antifoaming action while reliably preventing the repellency of the coloring resin for forming the label layer 7.

The non-silicon antifoaming agent has an inferior antifoaming action to the silicon antifoaming agent. On the other hand, the non-silicon antifoaming agent has a property that the coloring resin for forming the label layer 7 is repelled with more difficulty as compared with the silicon antifoaming agent. By using the non-silicon antifoaming agent in combination with the silicon antifoaming agent in an amount of 0.5 to 1.5 mass part, therefore, it is possible to increase the total amount of the antifoaming agent while reliably preventing the repellency of the coloring resin for forming the label layer 7. Thus, it is possible to form the second resin layer 6 which is very excellent in the flatness of a surface and a congeniality to the label layer 7.

For the non-silicon antifoaming agent, for example, it is possible to use an organic polar compound system or mineral oil system antifoaming agent such as 2-ethylhexanol, diisobutyl carbinol, oleic acid, tall oil, sorbitan monoester laurate, sorbitan monoester oleate, sorbitan triester oleate, low molecular weight polyethylene glycol oleate, a nonylphenol EO low molecular adduct, a pluronic type EO low molecular adduct, polypropylene glycol, a polypropylene glycol derivative or a copolymer of acrylic acid and butadiene, and a lower alcohol system antifoaming agent such as methanol, ethanol, isopropanol, sec-butanol or n-butanol.

Moreover, it is preferable that the amount of the non-silicon antifoaming agent to be added should be 1.0 to 5.5 mass part. In the case in which the amount of the non-silicon antifoaming agent to be added is smaller than 1.0 mass part, there is a possibility that the antifoaming action might become insufficient. On the other hand, in the case in which the same amount is larger than 5.5 mass part, there is a possibility that the curing property of an ultraviolet curing resin for forming the second resin layer 6 or the physical properties obtained after curing might be affected adversely.

Moreover, a filler such as silica or alumina may further be added to the ultraviolet curing resin for forming the second resin layer 6 in addition to the silicon antifoaming agent and the non-silicon antifoaming agent in order to regulate the viscosity or thixotropy of the ultraviolet curing resin.

When the second resin layer 6 is formed on the moisture-proof layer 5, the label layer 7 is subsequently formed on the second resin layer 6.

The label layer 7 is formed by applying the ultraviolet curing resins having different colors from each other to a whole or part of the surface of the second resin layer 6 sequentially and separately through a screen printing method.

The thickness of the label layer 7 is varied depending on a label to be formed. The label layer 7 is much thinner than the second resin layer 6 and is usually formed to have a thickness of 5 to 20 µm.

Figure 6:
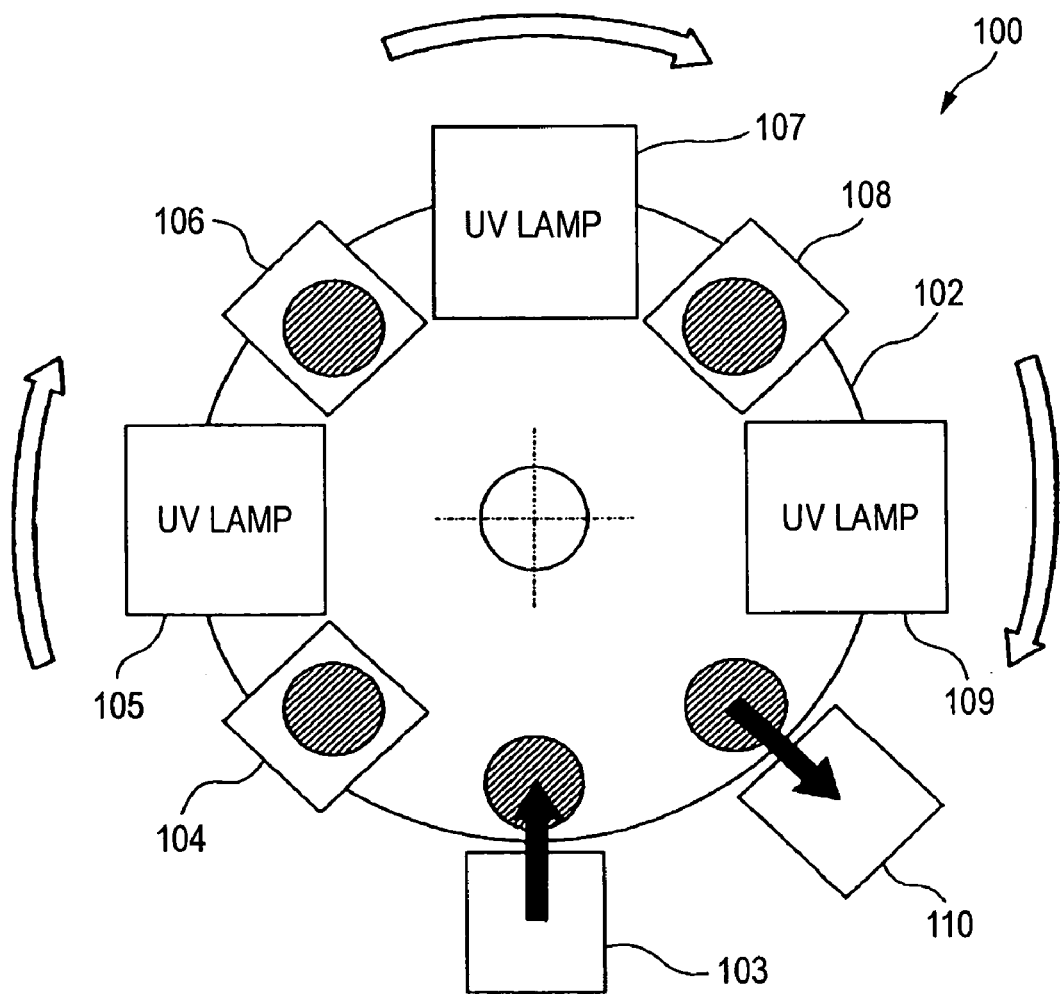
FIG. 6 is a schematic plan view showing the structure of a screen printer.

FIG. 6 is a schematic plan view showing the structure of a screen printer for forming the second resin layer 6 and the label layer 7.

As shown in FIG. 6, a screen printer 100 comprises a rotary table 102 constituted rotatably, a carry-in loader 103 for carrying in the support substrate 2 having the moisture-proof layer 5 formed thereon, a first screen printing portion 104 for forming an ultraviolet curing resin coated film on the surface of the support substrate 2 having the moisture-proof layer 5 formed thereon, a first UV lamp 105 for irradiating ultraviolet rays on the ultraviolet curing resin coated film formed on the moisture-proof layer 5, thereby forming the second resin layer 6, a second screen printing portion 106 for forming an ultraviolet curing resin coated film having a first color on the second resin layer 6, a second UV lamp 107 for irradiating the ultraviolet rays on the ultraviolet curing resin coated film formed on the second resin layer 6, a third screen printing portion 108 for forming an ultraviolet curing resin coated film having a second color on the second resin layer 6, a third UV lamp 109 for irradiating the ultraviolet rays on the ultraviolet curing resin coated film formed on the second resin layer 6, thereby forming the label layer 7, and a carry-out loader 110 for carrying out the support substrate 2 having the label layer 7 formed thereon.

Figure 7:
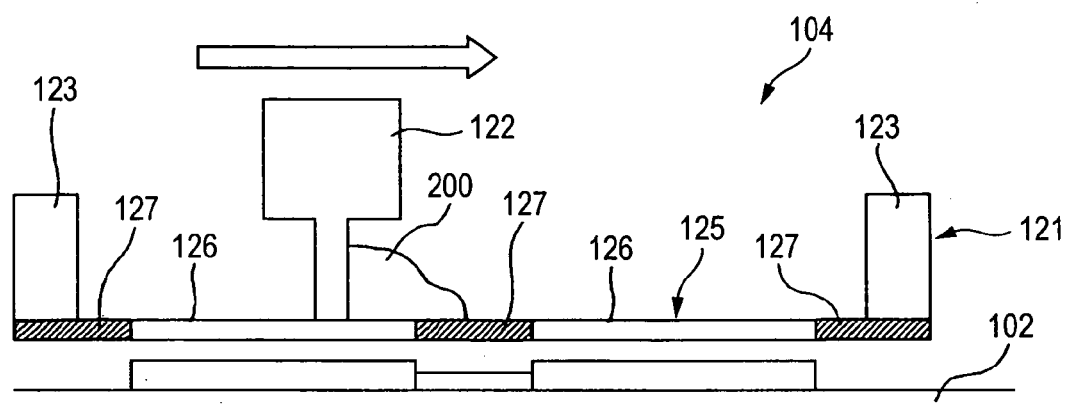
FIG. 7 is a schematic sectional view showing the structure of a screen printing portion.

FIG. 7 is a schematic sectional view showing the structure of the first screen printing portion 104.

As shown in FIG. 7, the first screen printing portion 104 includes a screen printing plate 121 opposed to the rotary table 102 and a squeegee 122 for pushing out an ultraviolet curing resin 200 on the screen printing plate 121.

As shown in FIG. 7, the screen printing plate 121 includes a plate frame 123 provided on the peripheral end of the screen printing plate 121, and a screen 125 fixed to the plate frame 123 without a looseness. The screen 125 is constituted by a screen having a double mesh structure in which two screens formed of stainless obtained by braiding metal wires of stainless like a mesh are superposed on each other. In order to form a resin coated film having a thickness of 30 to 200 μm by the screen printing method, the screen 125 is to have a great opening width and a large amount of discharge. More specifically, a screen having an amount of discharge of 50 to 200 ml/m$^2$ is preferable. The screen 125 is provided with a mask region 127 masked with an emulsion and a printing region 126 to be another region.

In order to form the second resin layer 6 and the label layer 7 by using the screen printer 100 having the structure described above, first of all, the support substrate 2 having the moisture-proof layer 5 formed thereon is carried in by means of the carry-in loader 103 and is set onto the rotary table 102. Next, the rotary table 102 is rotated in the direction of an arrow so that the support substrate 2 having the moisture-proof layer 5 formed thereon is moved to the first screen printing portion 104.

When the support substrate 2 having the moisture-proof layer 5 formed thereon is moved to the first screen printing portion 104, the squeegee 122 is slid from one of the ends of the screen printing plate 121 to the other end thereof in a state in which the surface of the screen 125 is pressurized. As a result, the ultraviolet curing resin 200 having a silicon antifoaming agent and a non-silicon antifoaming agent added thereto is pushed out of the printing region 126 of the screen 125 so that an ultraviolet curing resin coated film having a thickness of 30 to 200 μm is formed.

In the embodiment, the silicon antifoaming agent and the non-silicon antifoaming agent are added to the ultraviolet curing resin. When the ultraviolet curing resin is pushed out of the screen printing plate 121 by means of the squeegee 122, therefore, it is possible to remove bubbles generated in the ultraviolet curing resin coated film. Accordingly, it is possible to form an ultraviolet curing resin coated film having an excellent flatness of a surface.

When the ultraviolet curing resin coated film is formed on the moisture-proof film 5, the rotary table 102 is rotated so that the support substrate 2 having the ultraviolet curing resin coated film formed thereon is moved downward from the first UV lamp 105.

Subsequently, a shutter for covering the first UV lamp 105 is opened. The first UV lamp 105 is previously turned on, and the ultraviolet rays are irradiated on the ultraviolet curing resin when the shutter is opened. Thus, the ultraviolet curing resin coated film is cured so that the second resin layer 6 is formed.

In the embodiment, as described above, it is possible to form an ultraviolet curing resin coated film having an excellent flatness of a surface. Consequently, it is possible to form the second resin layer 6 having an excellent surface shape and a uniform thickness. Accordingly, it is possible to prevent the external appearance of the label layer 7 from being affected adversely, and furthermore, to form, by the screen printing method, the second resin layer 6 capable of minimizing a warp generated on the optical recording medium 1.

When the second resin layer 6 is formed, the rotary table 102 is rotated so that the support substrate 2 having the second resin layer 6 formed thereon is moved to the second screen printing portion 106.

Subsequently, the ultraviolet curing resin having a first color and prepared on the screen printing plate of the second screen printing portion 106 is pushed out by means of the squeegee. Consequently, an ultraviolet curing resin coated film for forming a label is provided on a whole or part of the surface of the second resin layer 6.

When the ultraviolet curing resin coated film having the first color is formed, the rotary table 102 is rotated so that the support substrate 2 provided with the ultraviolet curing resin coated film having the first color is moved downward from the second UV lamp 107. Next, the shutter of the second UV lamp 107 is opened so that the ultraviolet rays are irradiated and the ultraviolet curing resin coated film having the first color is cured. Thus, a first colored layer for forming the label layer 7 is provided.

When the first colored layer is formed, the rotary table 102 is rotated so that the support substrate 2 having the first colored layer formed thereon is moved to the third screen printing portion 108.

Next, the ultraviolet curing resin having a second color which is different from the first color and prepared on the screen printing plate of the third screen printing portion 108 is pushed out by means of the squeegee. Consequently, an ultraviolet curing resin coated film having the second color is formed on a whole or part of the surface of the second resin layer 6.

When the ultraviolet curing resin coated film having the second color is formed, the rotary table 102 is rotated so that the support substrate 2 provided with the ultraviolet curing resin coated film having the second color is moved downward from the third UV lamp 109. Then, the shutter of the third UV lamp 109 is opened so that the ultraviolet rays are irradiated and the ultraviolet curing resin coated film having the second color is cured. Consequently, a second colored layer for forming the label layer 7 is provided. Thus, the label layer 7 is formed so that the optical recording medium 1 is finished.

When the optical recording medium 1 is finished, the rotary table 102 is rotated so that the optical recording medium 1 is moved to the carry-out loader 110. The optical recording medium 1 moved to the carry-out loader 110 is carried out of the screen printer 100 by means of the carry-out loader 110 and is accommodated in a stocker (not shown).

As described above, in the embodiment, the silicon antifoaming agent and the non-silicon antifoaming agent are added to the ultraviolet curing resin for forming the second resin layer 6, and the bubbles generated in the ultraviolet curing resin coated film are removed. Therefore, it is possible to form the second resin layer 6 having an excellent surface shape and a uniform thickness by the screen printing method.

In the embodiment, thus, the second resin layer 6 can be formed by the screen printing method. Therefore, it is possible to continuously form both the second resin layer 6 and the label layer 7 by a single screen printer. When forming the second resin layer 6 and the label layer 7, accordingly, it is possible to eliminate a great deal of time and labor for carrying the support substrate 2 in/out of a spin coating device. Thus, a manufacturing process can be simplified.

In the case in which the second resin layer 6 is formed by the screen printing method, furthermore, the ultraviolet curing resin 200 on the screen 125 is pushed out by means of the squeegee 122 to apply the ultraviolet curing resin to the whole surface of the moisture-proof layer 5, thereby forming the ultraviolet curing resin coated film. Therefore, it is also possible to further reduce the amount of the ultraviolet curing resin to be used as compared with a spin coating method for forming the ultraviolet curing resin coated film by utilizing a centrifugal force to develop the ultraviolet curing resin.

According to the embodiment, therefore, it is possible to form a resin layer having an excellent flatness of a surface on the back of the support substrate 2 while simplifying the manufacturing process and reducing the amount of the ultraviolet curing resin to be used. Consequently, it is possible to prevent a cost from being increased, and at the same time, to form the second resin layer 6 having an excellent surface shape. Thus, it is possible to minimize the warp of the optical recording medium 1.

EXAMPLE

In order to cause the advantages of the invention to be clearer, examples will be described below.

Example 1

A sample #1 was fabricated in the following manner.

First of all, a disk-shaped polycarbonate substrate having a thickness of 1.1 mm and an outside diameter of 120 mm was fabricated by injection molding.

Next, a reflecting film containing Ag as a principal component and having a thickness of 100 nm, a second dielectric film containing a mixture of ZnS and $SiO_2$ and having a thickness of 10 nm, a recording film containing Sb—Te—Ge as a principal component and having a thickness of 10 nm, a first dielectric film containing a mixture of ZnS and $SiO_2$ and having a thickness of 20 nm, and a radiating film containing AlN as a principal component and having a thickness of 30 nm were sequentially formed on the surface of the polycarbonate substrate by sputtering so that an information layer was formed.

Subsequently, an ultraviolet curing resin A having the following composition was prepared.

| [Ultraviolet curing resin A] | |
|---|---|
| Urethane acrylate (manufactured by Negami Chemical Industrial Co., Ltd.: trade name "Art resin UN-5200") | 50 mass part |
| Trimethylolpropane triacrylate (manufactured by Nippon Kayaku Co., Ltd.: trade name "Kayarad TMPTA") | 33 mass part |
| Phenoxyhydroxy propylacrylate (manufactured by Nippon Kayaku Co., Ltd.: trade name "Kayarad R-128") | 14 mass part |
| 1-hydroxycyclohexylphenylketone (manufactured by Ciba-Geigy Ltd.: trade name "IRG184") | 3 mass part |

Subsequently, the polycarbonate substrate provided with the information layer was set into a spin coating device and the ultraviolet curing resin A was then applied onto the information layer by a spin coating method so that a coated film was formed. Thereafter, ultraviolet rays were irradiated in an integral light quantity of 1000 $mJ/cm^2$ on the coated film to cure the ultraviolet curing resin A so that a first resin layer having a thickness of 100 µm was formed.

Subsequently, the polycarbonate substrate having the first resin layer formed thereon was turned over, and a moisture-proof layer containing a mixture of ZnS and $SiO_2$ as a principal component and having a thickness of 50 nm was formed on the other surface of the polycarbonate substrate by the sputtering.

Then, 0.5 mass part of a silicon antifoaming agent (manufactured by JUJO CHEMICAL CO., LTD.: trade name "JA-750") was added to the ultraviolet curing resin A and they were stirred for one hour in an environment at a temperature of 50° C.

Subsequently, the polycarbonate substrate having the moisture-proof layer formed thereon was set into the screen printer, and the ultraviolet curing resin having the silicon antifoaming agent added thereto was applied onto the moisture-proof layer by a screen printing method so that a coated film was formed.

When forming the ultraviolet curing resin coated film on the moisture-proof layer by the screen printing method, there was used a screen printing plate having a double mesh structure in which two stainless screens "ST80" (trade name) having an opening width of 268 µm, a thickness of 95 to 100 µm and a discharge amount of 71.0 $ml/m^2$ and manufactured by TOKYO PROCESS SERVICE CO., LTD. are superposed on each other.

After the ultraviolet curing resin coated film was formed on the moisture-proof layer, the surface property of the ultraviolet curing resin coated film was evaluated, and furthermore, it was visually observed whether or not the silicon antifoaming agent soaks into the surface of the coated film.

When evaluating the surface property, it was visually observed whether or not large concavo-convex portions are formed on the surface of the coated film thus provided and bubbles are formed in the coated film by the screen printing method. In the evaluation, "A" indicates the case in which neither the concavo-convex portions nor the bubbles could be observed immediately after the coated film was formed, "B" indicates the case in which the concavo-convex portions and the bubbles were observed immediately after the coated film was formed, and the concavo-convex portions and the bubbles were removed in thirty seconds after the formation of the coated film, and "X" indicates the case in which either the concavo-convex portions or the bubbles were observed after thirty seconds passed since the formation of the coated film. The result of the evaluation of the surface property was "B".

Subsequently, ultraviolet rays were irradiated in an integral light quantity of 1000 $mJ/cm^2$ on the coated film to cure the ultraviolet curing resin so that a second resin layer having a thickness of 100 µm was formed.

Next, a white ink for screen printing "DVC-616 white" (trade name) manufactured by Teikoku Printing Inks Mfg. Co., Ltd. was applied to the surface of the second information layer by the screen printing method so that a coated film was formed. Then, ultraviolet rays were irradiated in an integral light quantity of 300 $mJ/cm^2$ on the coated film to cure the ultraviolet curing resin so that a white label layer having a thickness of 10 µm was formed.

Thus, the sample #1 was fabricated.

After the sample #1 was finished, the degree of repellency of the label layer was evaluated. In order to evaluate the degree of the repellency of the label layer, it was visually observed whether or not the label layer is repelled by the silicon antifoaming agent and a color unevenness or a turbidity is generated on the label layer. Thus, the evaluation was synthetically carried out together with the previous observation of the soaking of the silicon antifoaming agent. In the evaluation, "A" indicates that the soaking of the silicon antifoaming agent could not be observed and the color unevenness and turbidity of the label layer could not be observed, "B" indicates that the soaking of the silicon antifoaming agent was observed in a small amount and the color unevenness and turbidity of the label layer could not be observed, and "X" indicates that both the soaking of the silicon antifoaming agent and the color unevenness and turbidity of the label layer were observed. As a result of the evaluation, in the sample #1, the external appearance of the label layer was evaluated as "A".

Subsequently, samples #2 to #5 and comparative samples #1 to #3 were sequentially fabricated in the same manner as the sample #1 except that the content ratio of the silicon antifoaming agent was changed as shown in Table 1 to form the second resin layer.

TABLE 1

|  | Ultraviolet curing resin A (mass part) | Silicon antifoaming agent (mass part) |
| --- | --- | --- |
| Sample #1 | 100 | 0.5 |
| Sample #2 | 100 | 1.0 |
| Sample #3 | 100 | 1.5 |
| Sample #4 | 100 | 2.0 |
| Sample #5 | 100 | 2.6 |
| Comparative sample #1 | 100 | 0.25 |
| Comparative sample #2 | 100 | 3.1 |
| Comparative sample #3 | 100 | 5.3 |

In order to fabricate the sample #2 to the comparative sample #3, in the same manner as the sample #1, an ultraviolet curing resin coated film was formed on a polycarbonate substrate by a screen printing method and the surface property of the ultraviolet curing resin coated film and the soaking of a silicon antifoaming agent were then observed, and furthermore, a white label layer was formed on a second resin layer and the presence of the color unevenness and turbidity of the label layer was then observed to evaluate the degree of repellency of a label layer. The result of the evaluation is shown in Table 2.

TABLE 2

|  | Sample | | | | | Comparative sample | | |
| --- | --- | --- | --- | --- | --- | --- | --- | --- |
|  | #1 | #2 | #3 | #4 | #5 | #1 | #2 | #3 |
| Surface property | B | B | A | A | A | X | A | A |
| Repellency | A | A | B | B | B | A | X | X |

As shown in the Table 2, in all of the samples #1 to #5 in which the content of the silicon antifoaming agent is 0.5 to 2.8 mass part, it was found that an excellent surface property can be obtained and the label layer can be prevented from being repelled by the silicon antifoaming agent. In the samples #1 and #2, however, the soaking of the silicon antifoaming agent was not observed but the surface property of the ultraviolet curing resin coated film was slightly inferior to that of the samples #3 to #5. In the samples #3 to #5, moreover, it was apparent that the surface property of the ultraviolet curing resin coated film is excellent and a small amount of the silicon antifoaming agent soaks into the surface of the coated film.

To the contrary, in the comparative sample #1 in which the content of the silicon antifoaming agent is smaller than 0.5 mass part, the soaking of the silicon antifoaming agent was not found but the concavo-convex portions and the bubbles were found on the ultraviolet curing resin coated film, and a deterioration in the surface property of the coated film was observed. On the other hand, in the comparative samples #2 and #3 in which the content of the silicon antifoaming agent is larger than 2.8 mass part, the surface of the ultraviolet curing resin coated film was excellent, the soaking of the silicon antifoaming agent and the color unevenness and turbidity of the label layer were found, and a deterioration in the external appearance of the label layer was observed.

Subsequently, the samples #1 to #5 were left in an atmosphere of 25° C. respectively until their temperatures were stabilized, and each of the samples #1 to #5 was then set into a high precision laser warp angle measuring device "LA-2000" (trade name) manufactured by Keyence Corporation to measure a warp angle $\beta_1$ in a position of 58 mm from the center of each of the samples #1 to #5.

Furthermore, the samples #1 to #5 were left in an atmosphere of 55° C. respectively until the temperatures of the samples #1 to #5 were stabilized, and each of the samples #1 to #5 was then set into the high precision laser warp angle measuring device to measure a warp angle $\beta_2$ in the position of 58 mm from the center of each of the samples #1 to #5.

Subsequently, a difference ($\beta_2-\beta_1$) between the warp angle $\beta_2$ at 55° C. and the warp angle $\beta_1$ at 25° C. in each of the samples was obtained. The result is shown in Table 3.

TABLE 3

|  | Difference in warp angle (deg) |
| --- | --- |
| Sample #1 | 0.18 |
| Sample #2 | 0.18 |
| Sample #3 | 0.19 |
| Sample #4 | 0.20 |
| Sample #5 | 0.20 |

As shown in the Table 3, in all of the samples #1 to #5, the difference ($\beta_2-\beta_1$) between the warp angle $\beta_2$ at 55° C. and the warp angle $\beta_1$ at 25° C. was equal to or smaller than 0.30 deg. Thus, it was found that a warp can be prevented from being generated on the optical recording medium.

Example 2

A sample #6 was fabricated in the following manner.

First of all, in the same manner as in the sample #1, an information layer and a first resin layer were sequentially formed on one of the surfaces of a polycarbonate substrate, and furthermore, the polycarbonate substrate was turned over to form a moisture-proof layer on the other surface of the polycarbonate substrate.

Then, 0.5 mass part of a silicon antifoaming agent (manufactured by JUJO CHEMICAL CO., LTD.: trade name "JA-750") and 1.0 mass part of a non-silicon antifoaming agent (manufactured by Kusumoto Chemicals, Ltd.: trade name of "DISPARLON1951") were added to the ultraviolet curing resin A and they were stirred for one hour in an environment at a temperature of 50° C.

Subsequently, the ultraviolet curing resin having the silicon antifoaming agent and the non-silicon antifoaming agent added thereto was applied onto the moisture-proof layer through a screen printing method by utilizing the same screen printing plate as the screen printing plate used in the example 1 so that a coated film was formed.

After the ultraviolet curing resin coated film was formed on the moisture-proof layer, the surface property of the ultraviolet curing resin coated film was evaluated, and furthermore, it was visually observed whether or not either the silicon antifoaming agent or the non-silicon antifoaming agent soaks into the surface of the coated film in the same manner as in the example 1.

Subsequently, a white label layer was formed on the second resin layer and the sample #6 was thus fabricated in the same manner as the sample #1, and the presence of the color unevenness and turbidity of the label layer was then confirmed to evaluate the degree of repellency of the label layer in the same manner as in the example 1.

Next, samples #7 to #11 and comparative samples #4 and #5 were sequentially fabricated in the same manner as the sample #6 except that the content ratios of the silicon antifoaming agent and the non-silicon antifoaming agent were changed as shown in Table 4 to form the second resin layer.

TABLE 4

| | Ultraviolet curing resin A (mass part) | Silicon antifoaming agent (mass part) | Non-silicon antifoaming agent (mass part) |
|---|---|---|---|
| Sample #6 | 100 | 0.5 | 1.0 |
| Sample #7 | 100 | 0.5 | 5.3 |
| Sample #8 | 100 | 1.0 | 1.0 |
| Sample #9 | 100 | 1.0 | 5.3 |
| Sample #10 | 100 | 2.6 | 1.0 |
| Sample #11 | 100 | 2.7 | 5.4 |
| Comparative sample #4 | 100 | 0 | 1.0 |
| Comparative sample #5 | 100 | 0 | 5.3 |

In order to fabricate the sample #7 to the comparative sample #5, in the same manner as the sample #6, an ultraviolet curing resin coated film was formed on a polycarbonate substrate by a screen printing method and the surface property of the ultraviolet curing resin coated film and the soaking of an antifoaming agent were then confirmed, and furthermore, a white label layer was formed on a second resin layer and the presence of the color unevenness and turbidity of the label layer was thereafter confirmed to evaluate the degree of repellency of the label layer. The result of the evaluation is shown in Table 5.

TABLE 5

| | Sample | | | | | | Comparative sample | |
|---|---|---|---|---|---|---|---|---|
| | #6 | #7 | #8 | #9 | #10 | #11 | #4 | #5 |
| Surface property | A | A | A | A | A | A | X | X |
| Repellency | A | A | A | A | B | B | A | A |

As shown in the Table 5, in all of the samples #6 to #11 containing 0.5 to 2.8 mass part of a silicon antifoaming agent and 1.0 to 5.5 mass part of a non-silicon antifoaming agent, it was found that an excellent surface property can be obtained and the label layer can be prevented from being repelled by the antifoaming agent. In the samples #6 to #9 having the contents of the silicon antifoaming agent which are equal to those of the samples #1 and #2 in the example 1, particularly, the evaluation of the surface property was "A", though the evaluation of the surface property in the samples #1 and #2 was "B". From these results, both the silicon antifoaming agent and the non-silicon antifoaming agent were added to form the second resin layer. Consequently, it was found that the label layer can be reliably prevented from being repelled, and at the same time, the second resin layer having a very excellent flatness of a surface can be obtained.

On the other hand, in the comparative samples #4 and #5 in which only the non-silicon antifoaming agent was added to form the second resin layer, the soaking of the antifoaming agent and the color unevenness and turbidity of the label layer were not observed but concavo-convex portions and bubbles were observed on the ultraviolet curing resin coated film, and a deterioration in the surface property of the coated film was found.

The invention is not restricted to the embodiments and the examples but it is apparent that various changes can be made without departing from the scope of the invention described in the claims and are also included in the scope of the invention.

For example, in the optical recording medium 1 according to the embodiment shown in FIGS. 1 and 2, the write-once type or phase-change type information layer 3 is formed on the support substrate 2. The invention can also be applied to a read-only optical recording medium in which a pit is formed on the surface of the support substrate 2 and data are recorded by the pit.

In the process for manufacturing the optical recording medium according to the embodiment shown in FIG. 7, moreover, the ultraviolet curing resin coated film is formed by using the screen printing plate 121 including the screen 125 formed of stainless. If an ultraviolet curing resin coated film having a thickness of 30 to 200 μm can be formed, however, it is not necessary to form the ultraviolet curing resin coated film by using the screen printing plate including the screen formed of stainless. The ultraviolet curing resin coated film may be formed by using a screen printing plate including a screen constituted by a resin in which a resin fiber having a flexibility, for example, polyester is braided like a mesh or a metallic screen of a metal mask which has a flexibility in a vertical direction, and furthermore, a mechanical resistance and a chemical resistance.

In the process for manufacturing the optical recording medium according to the embodiment shown in FIG. 7, furthermore, the screen 125 is constituted by the screen having the double mesh structure in which the two screens are superposed on each other. The screen for forming the second resin layer 6 does not need to have the double mesh structure but may be formed by only one screen.

What is claimed is:

1. An optical recording medium comprising:
    a support substrate; and
    a first resin layer and a second resin layer which are formed to interpose the support substrate therebetween and have thicknesses of 30 to 200 μm respectively, a laser beam being irradiated through the first resin layer,
    wherein the second resin layer contains 0.5 to 2.8 mass part of a silicon antifoaming agent with respect to 100 mass part of an ultraviolet curing resin and is formed by a screen printing method.

2. The optical recording medium according to claim 1, wherein the second resin layer contains 0.5 to 1.5 mass part of the silicon antifoaming agent and a non-silicon antifoaming agent.

3. The optical recording medium according to claim 2, wherein the second resin layer contains 1.0 to 5.5 mass part of the non-silicon antifoaming agent.

4. The optical recording medium according to claim 1, wherein the second resin layer is formed by an ultraviolet curing resin having the antifoaming agent added thereto, and physical properties obtained after curing of the ultraviolet curing resin having the antifoaming agent added thereto are substantially identical to those of the first resin layer.

* * * * *